(12) United States Patent
Lin (10) Patent No.: US 12,418,819 B2
(45) Date of Patent: Sep. 16, 2025

(54) METHOD AND APPARATUS FOR SATELLITE ACCESS NETWORK MEASUREMENT WITHIN OVERLAPPING GAPS

(71) Applicant: MediaTek Inc., Hsinchu (TW)

(72) Inventor: Hsuan-Li Lin, Hsinchu (TW)

(73) Assignee: MediaTek Inc. (TW)

( * ) Notice: Subject to any disclaimer, the term of this patent is extended or adjusted under 35 U.S.C. 154(b) by 462 days.

(21) Appl. No.: 18/096,495

(22) Filed: Jan. 12, 2023

(65) Prior Publication Data

US 2023/0284062 A1 Sep. 7, 2023

Related U.S. Application Data

(60) Provisional application No. 63/316,006, filed on Mar. 3, 2022.

(51) Int. Cl.
*H04W 24/10* (2009.01)
*H04B 7/185* (2006.01)
*H04W 84/06* (2009.01)

(52) U.S. Cl.
CPC ........ *H04W 24/10* (2013.01); *H04B 7/18519* (2013.01); *H04W 84/06* (2013.01)

(58) Field of Classification Search
CPC .................. H04W 24/10; H04W 84/06; H04B 7/18519
See application file for complete search history.

(56) References Cited

U.S. PATENT DOCUMENTS

| 2019/0364469 | A1* | 11/2019 | Siomina | H04W 36/0085 |
|---|---|---|---|---|
| 2019/0394834 | A1 | 12/2019 | Cui et al. | |
| 2020/0252819 | A1 | 8/2020 | He et al. | |

(Continued)

FOREIGN PATENT DOCUMENTS

| CN | 103039108 A | 4/2013 |
|---|---|---|
| EP | 3713332 A1 | 9/2020 |
| WO | WO 2021068226 A1 | 4/2021 |

OTHER PUBLICATIONS

Taiwan Intellectual Property Office, Office Action in Taiwan Patent Application No. 112107550, Jun. 8, 2023.
(Continued)

*Primary Examiner* — Kent Krueger
(74) *Attorney, Agent, or Firm* — Andy M. Han; Han IP PLLC (57) ABSTRACT

Various solutions for satellite access network (SAN) or non-terrestrial network (NTN) measurement within overlapping gaps with respect to user equipment and network apparatus in mobile communications are described. An apparatus may receive configurations of a first measurement gap and a second measurement gap. The apparatus may determine whether the first measurement gap and the second measurement gap are non-fully overlapping or fully overlapping. The apparatus may perform measurements within the first measurement gap and the second measurement gap according to a priority in an event that the first measurement gap and the second measurement gap are non-fully overlapping. The apparatus may perform measurements within an extended measurement period in an event that the first measurement gap and the second measurement gap are fully overlapping.

18 Claims, 7 Drawing Sheets

(56) References Cited

U.S. PATENT DOCUMENTS

| | | | |
|---|---|---|---|
| 2020/0389929 A1* | 12/2020 | Harada | H04W 24/10 |
| 2020/0413358 A1* | 12/2020 | Harada | H04W 56/001 |
| 2021/0410024 A1 | 12/2021 | Tang et al. | |
| 2022/0046498 A1 | 2/2022 | Cheng et al. | |
| 2022/0174623 A1* | 6/2022 | Zheng | H04W 24/08 |
| 2024/0080694 A1* | 3/2024 | Yang | H04W 36/0088 |

OTHER PUBLICATIONS

China National Intellectual Property Administration, International Search Report in PCT/CN2023/075351, May 23, 2023.

Zte Corporation: "Views on NCSG", R4-2113210, 3GPP TSG-RAN WG4 Meeting #100-e, Electronic Meeting, Aug. 16-27, 2021.

Huawei et al.: "Discussion on NCSG", R4-2114307, 3GPP TSG-RAN WG4 Meeting #100-e, Electronic Meeting, Aug. 16-27, 2021.

Taiwan Intellectual Property Office, Office Action in Taiwan Patent Application No. 112107551, Jul. 28, 2023.

Mediatek Inc.: "WF on R17 NR MG enhancements—Multiple concurrent and independent MG patterns", R4-2108346, 3GPP TSG-RAN WG4 99-e Meeting, Electronic Meeting, May 19-27, 2021.

Apple: "Discussion on multiple concurrent and independent MG patterns", R4-2100222, 3GPP TSG-RAN4 Meeting 98-e, Online, Jan. 25-Feb. 5, 2021.

Qualcomm Incorporated: "On multiple concurrent measurement gaps", R4-2204468, 3GPP TSG-RAN WG4 Meeting, 102-e, Online Meeting, Feb. 21-Mar. 3, 2022.

European Patent Office, Extended European Search Report in European Patent Application No. 23157779.2, Jul. 12, 2023.

Qualcomm Incorporated: "Email discussion summary: [102-e] [220] NR_NRN_solutions_RRM_1", 3GPP Draft; R4-2206763, 3rd Generation Partnership Project (3GPP), Mobile Competence Centre; Sophia-Antipolis Cedex; France, vol. RAN WG4, No. Electronic Meeting; Feb. 21, 2022-Mar. 3, 2022, Feb. 25, 2022, XP052116944.

Apple: "Discussion on measurement procedure requirements for NTN", 3GPP Draft; R4-2203795; 3rd Generatino Partnership Proejct (3GPP), Mobile Competence Centre; Sophia-Antipolis Cedex; France, vol. RAN WG4, No. Electronic Meeting; Feb. 21, 2022-Mar. 3, 2022, Feb. 14, 2022, XP052115201.

* cited by examiner

Measurement period for inter-frequency measurements with gaps (Frequency FR1)

| DRX cycle | $T_{SSB\_measurement\_period\_inter}$ |
|---|---|
| No DRX | Max(200ms, 8 × Max(MGRP, SMTC period)) × $CSSF_{inter}$ × K_satellite |
| DRX cycle ≤ 320ms | Max(200ms, Ceil(8 × 1.5) × Max(MGRP, SMTC period, DRX cycle)) × $CSSF_{inter}$ × K_satellite |
| DRX cycle > 320ms | 8 × DRX cycle × $CSSF_{inter}$ × K_satellite |

620 ⟶

NTN

Measurement period for inter-frequency measurements with gaps (Frequency FR1)

| DRX cycle | $T_{SSB\_measurement\_period\_inter}$ |
|---|---|
| No DRX | Max(200ms, 8 × Max(MGRP, SMTC period)) × $CSSF_{inter}$ × K_satellite × MG |
| DRX cycle ≤ 320ms | Max(200ms, Ceil(8 × 1.5) × Max(MGRP, SMTC period, DRX cycle)) × $CSSF_{inter}$ × K_satellite × MG |
| DRX cycle > 320ms | 8 × DRX cycle × $CSSF_{inter}$ × K_satellite × MG |

METHOD AND APPARATUS FOR SATELLITE ACCESS NETWORK MEASUREMENT WITHIN OVERLAPPING GAPS

CROSS REFERENCE TO RELATED PATENT APPLICATION(S)

The present disclosure claims the priority benefit of U.S. Provisional Patent Application No. 63/316,006, filed on 3 Mar. 2022. The contents of aforementioned applications are herein incorporated by reference in their entirety.

TECHNICAL FIELD

The present disclosure is generally related to mobile communications and, more particularly, to satellite access network (SAN) or non-terrestrial network (NTN) measurement within overlapping gaps with respect to user equipment (UE) and network apparatus in mobile communications.

BACKGROUND

Unless otherwise indicated herein, approaches described in this section are not prior art to the claims listed below and are not admitted as prior art by inclusion in this section.

In mobile/wireless communications, more and more attentions and participation were drawn into satellite communications, with companies and organizations convinced of the market potential for an integrated satellite and terrestrial network infrastructure in the context of 3rd Generation Partnership Project (3GPP) 5G standards. Satellites refer to spaceborne vehicles in Low Earth Orbits (LEO), Medium Earth Orbits (MEO), Geostationary Earth Orbit (GEO) or in Highly Elliptical Orbits (HEO). 5G standards make Non-Terrestrial Networks (NTN), including satellite segments, a recognized part of 3GPP 5G connectivity infrastructure. A low earth orbit is an earth-centered orbit with an altitude of 2,000 km or less, or with a period of 128 minutes or less (i.e., making at least 11.25 orbits per day) and an eccentricity less than 0.25. Most of the artificial objects in outer space are in non-geostationary satellite orbit (NGSO) (e.g., LEO or MEO) with an altitude never more than about one-third of the radius of earth. NGSO satellites orbit around the earth at a high speed (mobility), but over a predictable or deterministic orbit.

One of the challenges in NGSO communications is that the Doppler shift is huge since the NGSO satellites move at a high speed. The Doppler shift of a LEO-600 km network can be up to 24 parts per million (ppm). For example, in the 2 gigahertz (GHz) carrier, the maximum Doppler shift of a LEO satellite can be up to +/−48 kilohertz (kHz). Therefore, satellite/cell measurements in NGSO satellite-based NTN can be quite different from terrestrial networks. In terrestrial networks, cells/base stations are well synchronized in frequency and the Doppler shifts among cells/base stations are minor. No need to consider Doppler effect when performing measurements. However, in NTN or SAN, Doppler effect is significant and Doppler shifts among satellites/cells are large. This will cause additional burdens on the UE in processing frequency/time drifts when performing satellite/cell measurements. The capability/cost requirements including hardware and software for the UE will become more complex and expensive.

Accordingly, how to overcome large Doppler shifts becomes an important issue for satellite communications in the newly developed wireless communication network. Therefore, there is a need to provide proper schemes to perform satellite/cell measurements without increasing UE burdens and requirements.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to SAN or NTN measurement within overlapping gaps with respect to user equipment and network apparatus in mobile communications.

In one aspect, a method may involve an apparatus receiving configurations of a first measurement gap and a second measurement gap. The method may also involve the apparatus determining whether the first measurement gap and the second measurement gap are non-fully overlapping or fully overlapping. The method may further involve the apparatus performing measurements within the first measurement gap and the second measurement gap according to a priority in an event that the first measurement gap and the second measurement gap are non-fully overlapping. The method may further involve the apparatus performing measurements within an extended measurement period in an event that the first measurement gap and the second measurement gap are fully overlapping.

In one aspect, an apparatus may comprise a transceiver which, during operation, wirelessly communicates with at least one network node of a wireless network. The apparatus may also comprise a processor communicatively coupled to the transceiver. The processor, during operation, may perform operations comprising receiving, via the transceiver, configurations of a first measurement gap and a second measurement gap. The processor may also perform operations comprising determining whether the first measurement gap and the second measurement gap are non-fully overlapping or fully overlapping. The processor may further perform operations comprising performing measurements within the first measurement gap and the second measurement gap according to a priority in an event that the first measurement gap and the second measurement gap are non-fully overlapping. The processor may further perform operations comprising performing measurements within an extended measurement period in an event that the first measurement gap and the second measurement gap are fully overlapping.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), Industrial Internet of Things (IIoT), and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to SAN or NTN measurement within overlapping gaps with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

Figure 1:
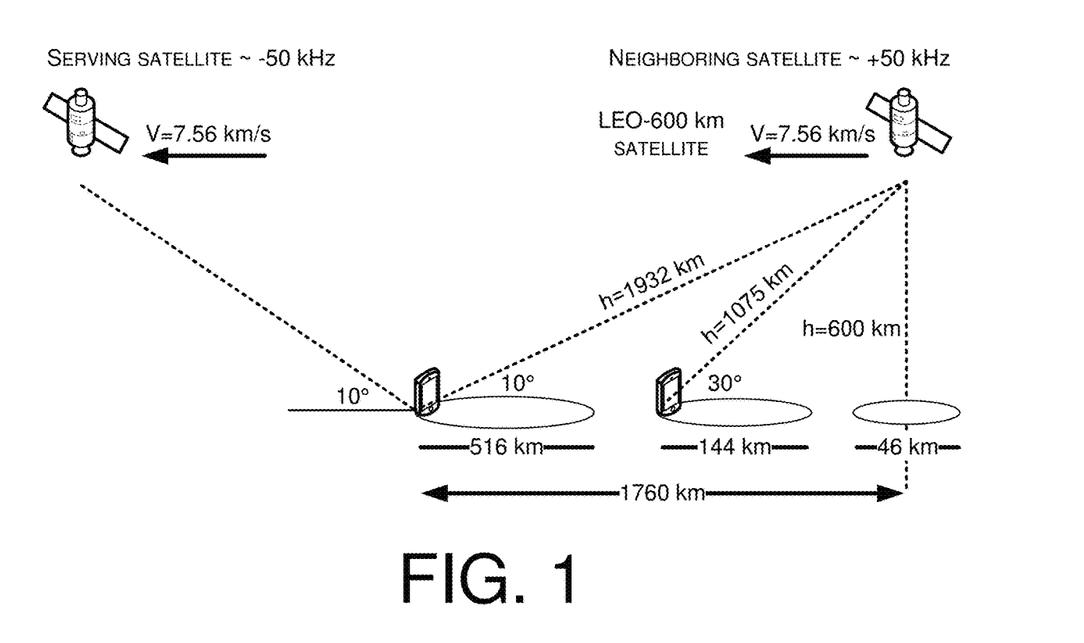
FIG. 1 is a diagram depicting an example scenario under schemes in accordance with implementations of the present disclosure.

According to the reference scenario parameters of Table 4.2-2 in 3GPP TR 38.821, the maximum Doppler shift of a LEO-600 km network can be up to 24 ppm. In addition, the Doppler of a serving satellite and a neighboring satellite may be with different signs (e.g., the serving satellite is leaving the UE while the neighboring cell is approaching to the UE). FIG. 1 illustrates an example scenario 100 under schemes in accordance with implementations of the present disclosure. Scenario 100 involves at least one UE and a plurality of network nodes (e.g., satellites), which may be a part of a wireless communication network (e.g., an LTE network, a 5G/NR network, an IoT network or a 6G network). As shown in FIG. 1, the satellites are deployed in LEO or NGSO and orbit around the earth at a high speed. The UE on the ground needs to connect to a serving satellite for SAN or NTN communications. The UE may also need to perform some measurements on a neighboring satellite for mobility management. Under scenario 100, the UE is located between two satellites. Thus, the serving satellite is leaving the UE and the neighboring cell is approaching to the UE. The Doppler shift will become large/significant under such situation. For example, the Doppler shift of the serving satellite observed at the UE could be −50 kHz whereas the Doppler shift of the neighboring satellite observed at the UE could be +50 KHz. It leads up to around 100 KHz frequency separation between the serving satellite and the neighboring satellite.

Figure 2:
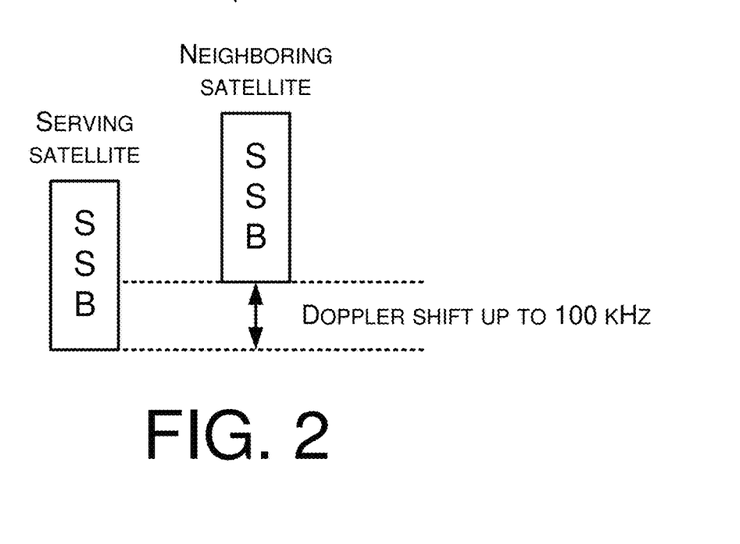
FIG. 2 is a diagram depicting an example scenario under schemes in accordance with implementations of the present disclosure.

FIG. 2 illustrates an example scenario 200 under schemes in accordance with implementations of the present disclosure. The Doppler shift between the reference signals (e.g., Synchronization Signal Block (SSB)) from the serving satellite and the neighboring satellite at 2 GHz can be up to 100 kHz. In other words, if two satellites are configured in one measurement object (MO) with the same absolute radio frequency channel number (ARFCN), up to 100 kHz Doppler shift can be observed. Therefore, extra hardware would be needed to receive/measure on different satellites. For example, the UE may need to be equipped with two transceivers to perform measurements on the neighboring satellite while connecting to the serving satellite. Additional hardware/software costs may be also needed for measuring/communicating with the two satellites at the same time.

In SAN or NTN, a plurality of measurement gaps (MGs) could be configured to the UE to include different synchronization signal block (SSB) measurement timing configurations (SMTCs) to perform measurements. Multiple measurement gaps may be configured for measuring multiple neighboring satellites. In some scenarios, the measurement gaps could be overlapped with each other. For example, due to the Doppler effect in NGSO, two configured measurements gaps could be overlapped. However, the UE may not be able to perform measurement concurrently on those 2 overlapping gaps. Due to hardware/software capability limit, the UE may only be able to perform measurement within one measurement gap at a time. Therefore, in an event that a conflict occurs among multiple measurement gaps, some solutions are needed for measuring the overlapping gaps.

In view of the above, the present disclosure proposes several schemes pertaining to measurements within overlapping gaps with respect to UE and network apparatus in SAN or NTN. According to the schemes of the present disclosure, some time-division multiplexing (TDM) manners may be introduced to resolve the aforementioned issues for perform serving cell/satellite measurements and neighboring cell/satellite measurements. The TDM manners may comprise using some priority rules or a scaling/sharing factor when performing the measurements. For example, a priority may be configured for each measurement gap. The measurement gap occasion with low priority will be dropped if measurement gap occasions are overlapped in time domain. In another example, a scaling/sharing factor may be applied to scale up a measurement period. The UE is allowed to measure the overlapping gaps in a TDM manner within an extended measurement period. Accordingly, the UE is able to support SAN/NTN measurements on multiple cells/satellites (e.g., NGSO satellites) and mobility performance without significant increase in UE measurement resources (e.g., hardware/software resources) or capability requirements. Some balances can be reached between mobility performance and UE design costs.

Specifically, the UE may be configured to receive configurations of a first measurement gap and a second measurement gap. The UE may determine whether the first measurement gap and the second measurement gap are non-fully overlapping or fully overlapping. The UE may perform measurements within the first measurement gap and the second measurement gap according to a priority in an event that the first measurement gap and the second measurement gap are non-fully overlapping. The UE may perform measurements within an extended measurement period in an event that the first measurement gap and the second measurement gap are fully overlapping.

Figure 3:
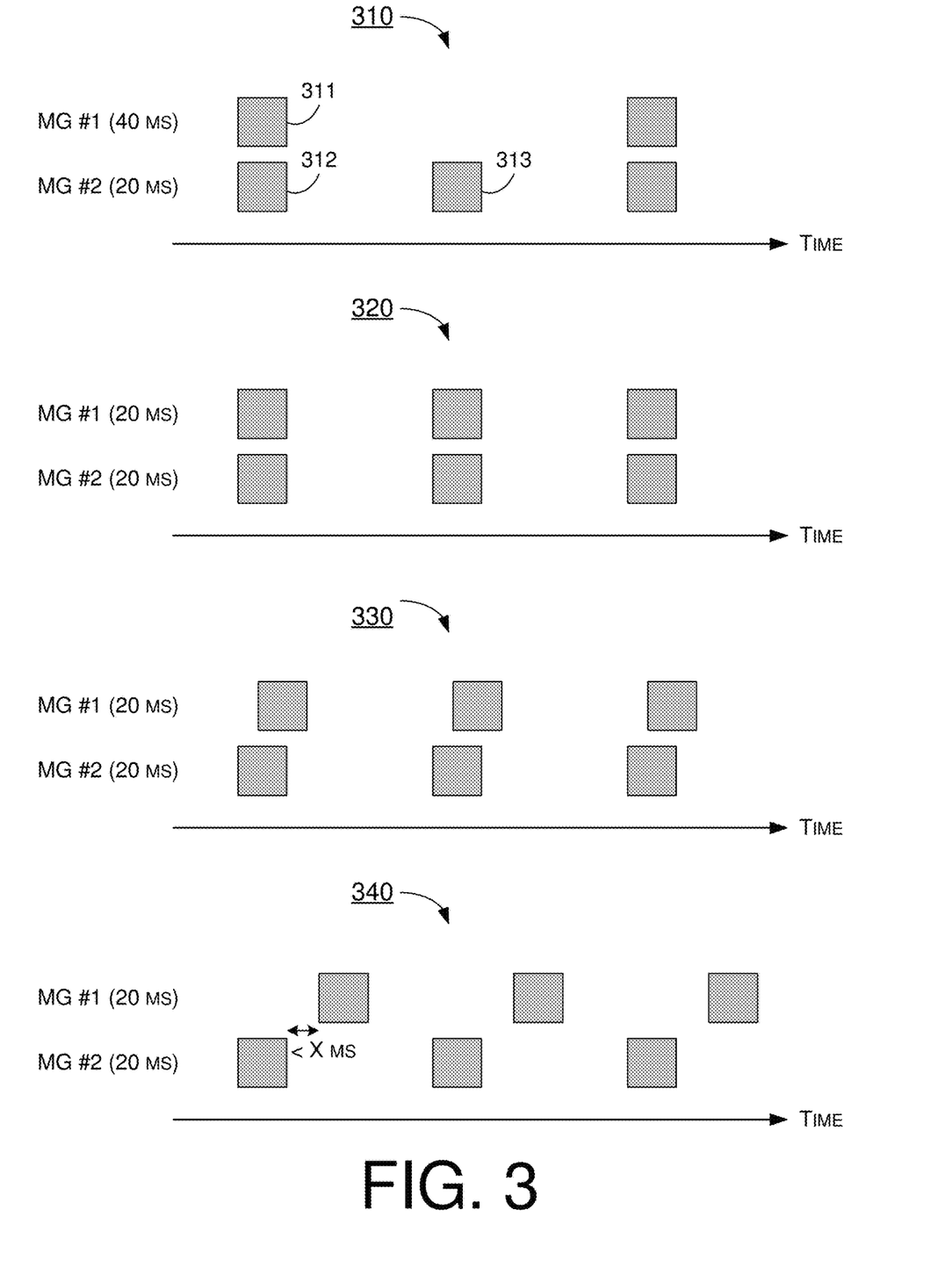
FIG. 3 is a diagram depicting example scenarios under schemes in accordance with implementations of the present disclosure.

FIG. 3 illustrates example scenarios 310, 320, 330 and 340 under schemes in accordance with implementations of the present disclosure. Scenarios 310, 320, 330 and 340 involve at least one UE and a plurality of network nodes (e.g., satellites), which may be a part of a wireless communication network (e.g., an LTE network, a 5G/NR network, an IoT network or a 6G network). Scenario 310 illustrates an example of non-fully overlapping measurement gaps. The first measurement gap (e.g., MG #1) is configured with a periodicity of 40 millisecond (ms) and the second measurement gap (e.g., MG #2) is configured with a periodicity of 20 ms. The measurement gap occasion 311 of MG #1 is overlapped (or collided) with the measurement gap occasion 312 of MG #2. Since the periodicities of MG #1 and MG #2 are different, the measurement gap occasion 313 of MG #2 is not overlapped (nor collided) with any measurement gap occasion of MG #1. Thus, the gap patterns of MG #1 and MG #2 are non-fully overlapped. The UE may determine that the first measurement gap and the second measurement gap are non-fully overlapping in an event that a measurement gap occasion of the first measurement gap is not overlapped with a measurement gap occasion of the second measurement gap.

Scenario 320 illustrates an example of fully overlapping measurement gaps. The first measurement gap (e.g., MG #1) is configured with the same periodicity (e.g., 20 ms) as the second measurement gap (e.g., MG #2). Each measurement gap occasion of MG #1 is fully overlapped with each measurement gap occasion of MG #2. Each measurement gap occasion of MG #1 is collided with each measurement gap occasion of MG #2. Thus, the gap patterns of MG #1 and MG #2 are fully overlapped. The UE may determine that the first measurement gap and the second measurement gap are fully overlapping in an event that a measurement gap occasion of the first measurement gap is overlapped with a measurement gap occasion of the second measurement gap.

Scenario 330 illustrates another example of fully overlapping measurement gaps. The first measurement gap (e.g., MG #1) is configured with the same periodicity (e.g., 20 ms) as the second measurement gap (e.g., MG #2). Each measurement gap occasion of MG #1 is partially overlapped with each measurement gap occasion of MG #2. Each measurement gap occasion of MG #1 is collided with each measurement gap occasion of MG #2. Since the measurements within MG #1 and MG #2 could still be concurrent, the gap patterns of MG #1 and MG #2 are deemed as fully overlapped. The UE may determine that the first measurement gap and the second measurement gap are fully overlapping in an event that a measurement gap occasion of the first measurement gap is partially overlapped with a measurement gap occasion of the second measurement gap.

Scenario 340 illustrates another example of fully overlapping measurement gaps. The first measurement gap (e.g., MG #1) is configured with the same periodicity (e.g., 20 ms) as the second measurement gap (e.g., MG #2). There is a gap between each measurement gap occasion of MG #1 and each gap measurement occasion of MG #2. Since the UE may be unable to switch its transceiver from MG #1 to MG #2 in a short time, the UE still cannot perform measurements for both MG #1 and MG #2. Thus, in a condition that the gap in time distance between the measurement gap occasion of MG #1 and the measurement gap occasion of MG #2 is less than a threshold or a pre-determined value (e.g., <X ms), the gap patterns of MG #1 and MG #2 are deemed as fully overlapped. The UE may determine that the first measurement gap and the second measurement gap are fully overlapping in an event that a gap in time distance between the measurement gap occasion of the first measurement gap and the measurement gap occasion of the second measurement gap is less than a threshold.

Figure 4:
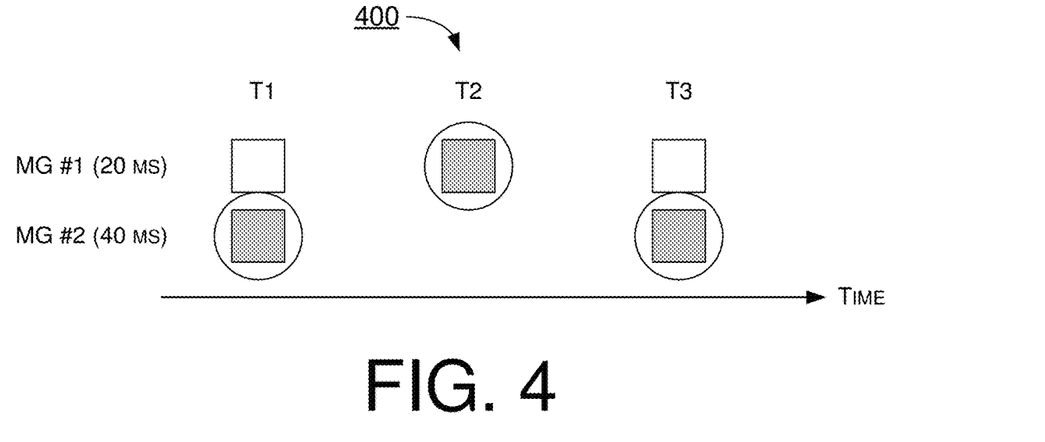
FIG. 4 is a diagram depicting an example scenario under schemes in accordance with implementations of the present disclosure.

FIG. 4 illustrates an example scenario 400 under schemes in accordance with implementations of the present disclosure. Scenario 400 involves at least one UE and a plurality of network nodes (e.g., satellites), which may be a part of a wireless communication network (e.g., an LTE network, a 5G/NR network, an IoT network or a 6G network). Scenario 400 illustrates an example of measurement scheme for non-fully overlapping measurement gaps. The UE may receive configurations of a first measurement gap (e.g., MG #1) and a second measurement gap (e.g., MG #2). The configurations may comprise a first priority of MG #1 and a second priority of MG #2. Different priorities can be configured on different measurement gaps. The measurement gap with longer measurement gap repetition period (MGRP) can be configured with a higher priority. For example, MG #2 is configured with a higher priority and MG #1 is configured with a lower priority. The UE may be configured to measure the higher priority measurement gap if the measurement gap occasions come at the same time. For example, at time period T1, the measurement gap occasion of MG #1 and the measurement gap occasion of MG #2 are concurrent. The UE may perform the measurement within MG #2 since MG #2 has higher priority. At time period T2, only the measurement gap occasion of MG #1 comes. The UE may perform the measurement within MG #1. At time period T3, the measurement gap occasion of MG #1 and the measurement gap occasion of MG #2 are concurrent. The UE may perform the measurement within MG #2 since MG #2 has higher priority.

Figure 5:
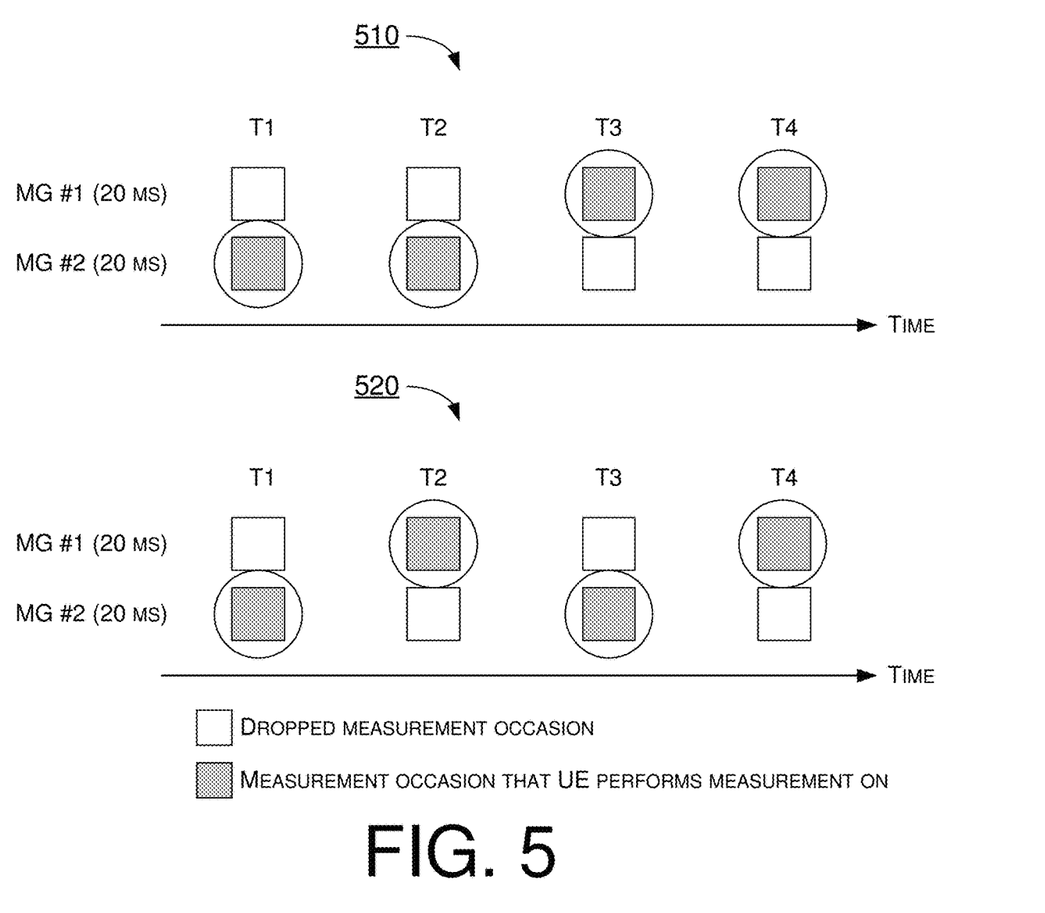
FIG. 5 is a diagram depicting example scenarios under schemes in accordance with implementations of the present disclosure.

FIG. 5 illustrates example scenarios 510 and 520 under schemes in accordance with implementations of the present disclosure. Scenarios 510 and 520 involves at least one UE and a plurality of network nodes (e.g., satellites), which may be a part of a wireless communication network (e.g., an LTE network, a 5G/NR network, an IoT network or a 6G network). Scenarios 510 and 520 illustrate examples of measurement schemes for fully overlapping measurement gaps. The UE may receive configurations of a first measurement gap (e.g., MG #1) and a second measurement gap (e.g., MG #2). Since the UE can only measure on one measurement gap at a time, the measurement time is extended (i.e., scaled up) by a number of fully overlapping measurement gap. The UE may be configured to determine an extended measurement period according to a number of the fully overlapping measurement gaps. For example, two measurement gaps (e.g., MG #1 and e.g., MG #2) are determined as fully overlapped. The UE may determine that the scaling/sharing factor is equal to 2. The UE may determine the extended measurement period by applying the scaling/sharing factor. Then, the UE may perform the measurements within the extended measurement period by a TDM manner.

For example, the UE may perform the measurements within the first measurement gap and the second measurement gap in turn. As shown in scenario 510, the measurement gap occasions of MG #1 and the measurement gap occasions of MG #2 are concurrent. The UE may perform the measurement within MG #2 first at time periods T1 and T2. Then, the UE may take turns to perform the measurement within MG #1 at time periods T3 and T4. The UE may take turns to perform the measurements between MG #1 and MG #2 by two measurement gap occasions. Alternatively, as shown in scenario 520, the measurement gap occasions of MG #1 and the measurement gap occasions of MG #2 are concurrent. The UE may perform the measurement within MG #2 first at time period T1. Then, the UE may take turns to perform the measurement within MG #1 at time period T2. The UE may take turns to perform the measurements between MG #1 and MG #2 by one measurement gap occasion. Which gap occasion and the corresponding frequency should be measured can be determined according to the UE implementation.

Figure 6:
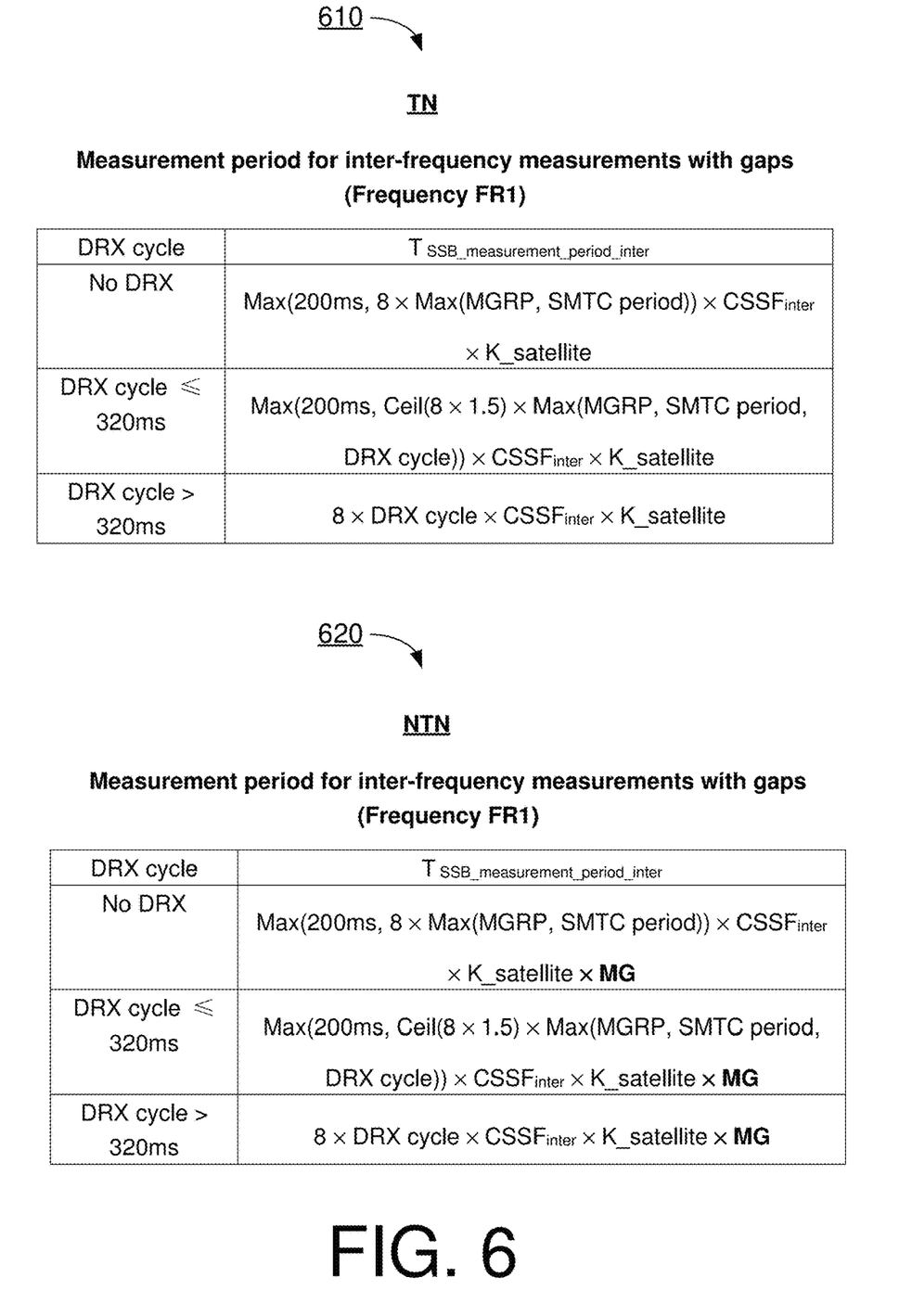
FIG. 6 is a diagram depicting example scenarios under schemes in accordance with implementations of the present disclosure.

FIG. 6 illustrates example scenarios 610 and 620 under schemes in accordance with implementations of the present disclosure. Scenarios 610 and 620 involve at least one UE and a plurality of network nodes (e.g., satellites), which may be a part of a wireless communication network (e.g., an LTE network, a 5G/NR network, an IoT network or a 6G network). The satellites are deployed in NGSO and orbit around the earth at a high speed. The UE on the ground connects to a serving satellite for SAN or NTN communications. The UE needs to perform measurements on a neighboring satellite for mobility management. At first, the UE may receive a first ephemeris of the serving satellite and a second ephemeris of the neighboring satellite. The UE may further receive a measurement gap configuration (e.g., measurement objects) from the serving satellite. Then, the UE needs to determine whether to perform a measurement within the measurement gap (i.e., gap-based measurement) for the neighboring satellite by determining whether the serving satellite and the neighboring satellite are different satellites. The neighboring satellite measurement may be an inter-frequency measurement.

Once the UE determines that it needs to perform the neighboring satellite measurement, it may determine a measurement period for the measurement. Scenario 610 shows the measurement period for inter-frequency measurements with gaps for frequency range 1 (FR1) in the terrestrial network (TN). The UE may determine the measurement period (e.g., TssB_measurement_period_inter) according to the equations in scenario 610. For example, different equations may be used for different DRX cycles (e.g., no DRX, DRX cycle≤320 ms or DRX cycle>320 ms). These equations may consider the parameters comprising, for example but not limited to, measurement gap repetition period (MGRP), SMTC period, carrier specific scaling factor (CSSF), DRX cycle, etc.

According to the schemes of the present disclosure, the basic TN measurement period needs to be scaled up when multiple measurement gaps are determined as fully overlapped. The UE may determine a scaling factor (e.g., MG) for extending the basic TN measurement period. For example, the UE may determine that MG=the number of fully overlapping measurement gaps. Then, the UE may determine the extended measurement period for NTN/SAN measurement by applying the scaling factor (e.g., MG) on the basic TN measurement period. Scenario 620 shows the extended measurement period for inter-frequency measurements with gaps for FR1 in the NTN/SAN. The scaling factor (e.g., MG) is introduced/added in the equations used for the TN measurement. The UE may scale up the basic TN measurement period by multiplying the scaling factor (e.g., MG) directly. After determining the extended measurement period, the UE may perform inter-frequency measurement within the extended measurement period.

Figure 7:
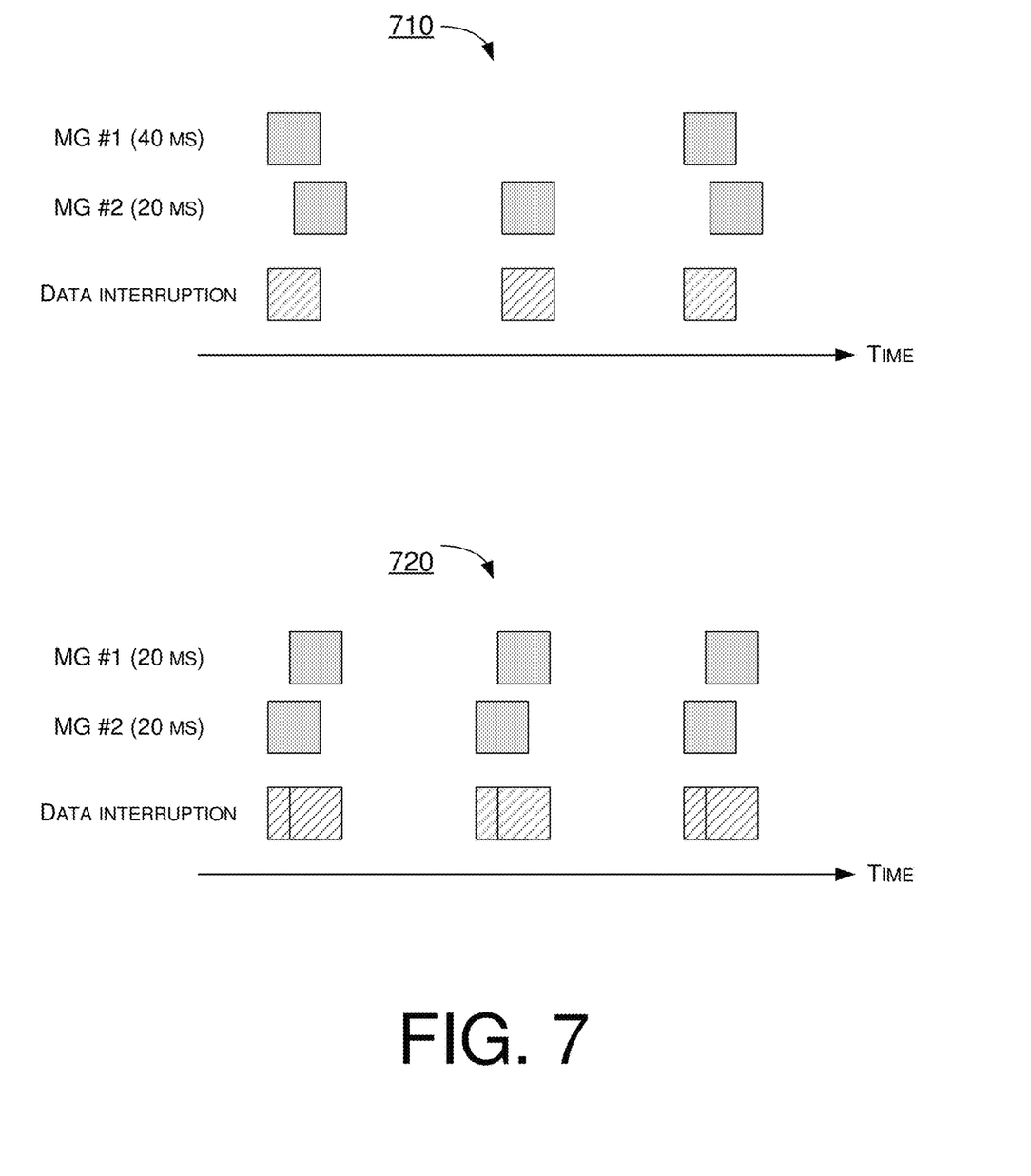
FIG. 7 is a diagram depicting example scenarios under schemes in accordance with implementations of the present disclosure.

FIG. 7 illustrates example scenarios 710 and 720 under schemes in accordance with implementations of the present disclosure. Scenarios 710 and 720 involve at least one UE and a plurality of network nodes (e.g., satellites), which may be a part of a wireless communication network (e.g., an LTE network, a 5G/NR network, an IoT network or a 6G network). Scenario 710 illustrates an example of data interruption for non-fully overlapping measurement gaps. The UE may receive configurations of a first measurement gap (e.g., MG #1) and a second measurement gap (e.g., MG #2). The UE may determine that MG #1 and MG #2 are non-fully overlapping. Under the non-fully overlapping scenario, the UE may perform measurements within MG #1 and MG #2 according to their priorities. In other words, only one measurement gap occasion will be chosen for measurement based on the priorities at a time. The UE and the network node may allow a data interruption within MG #1 or MG #2 (i.e., single measurement gap). The UE may cancel/ignore data reception and data transmission within MG #1 or MG #2. The network node is not expected to schedule uplink/downlink data within MG #1 or MG #2.

Scenario 720 illustrates an example of data interruption for fully overlapping measurement gaps. The UE may receive configurations of a first measurement gap (e.g., MG #1) and a second measurement gap (e.g., MG #2). The UE may determine that MG #1 and MG #2 are fully overlapping. Under the fully overlapping scenario, the UE may perform measurements within MG #1 and MG #2 in turn. In other words, at a time period, either the measurement gap occasion of MG #1 or the measurement gap occasion of MG #2 will be used by the UE. The network node does not know which measurement gap will be used by the UE. Thus, the network node should not schedule uplink/downlink data within both MG #1 and MG #2. The UE and the network node may allow a data interruption within MG #1 and MG #2 (i.e., both measurement gaps). The UE may cancel/ignore data reception and data transmission within MG #1 and MG #2. The network node is not expected to schedule uplink/downlink data within MG #1 and MG #2.

Illustrative Implementations

Figure 8:
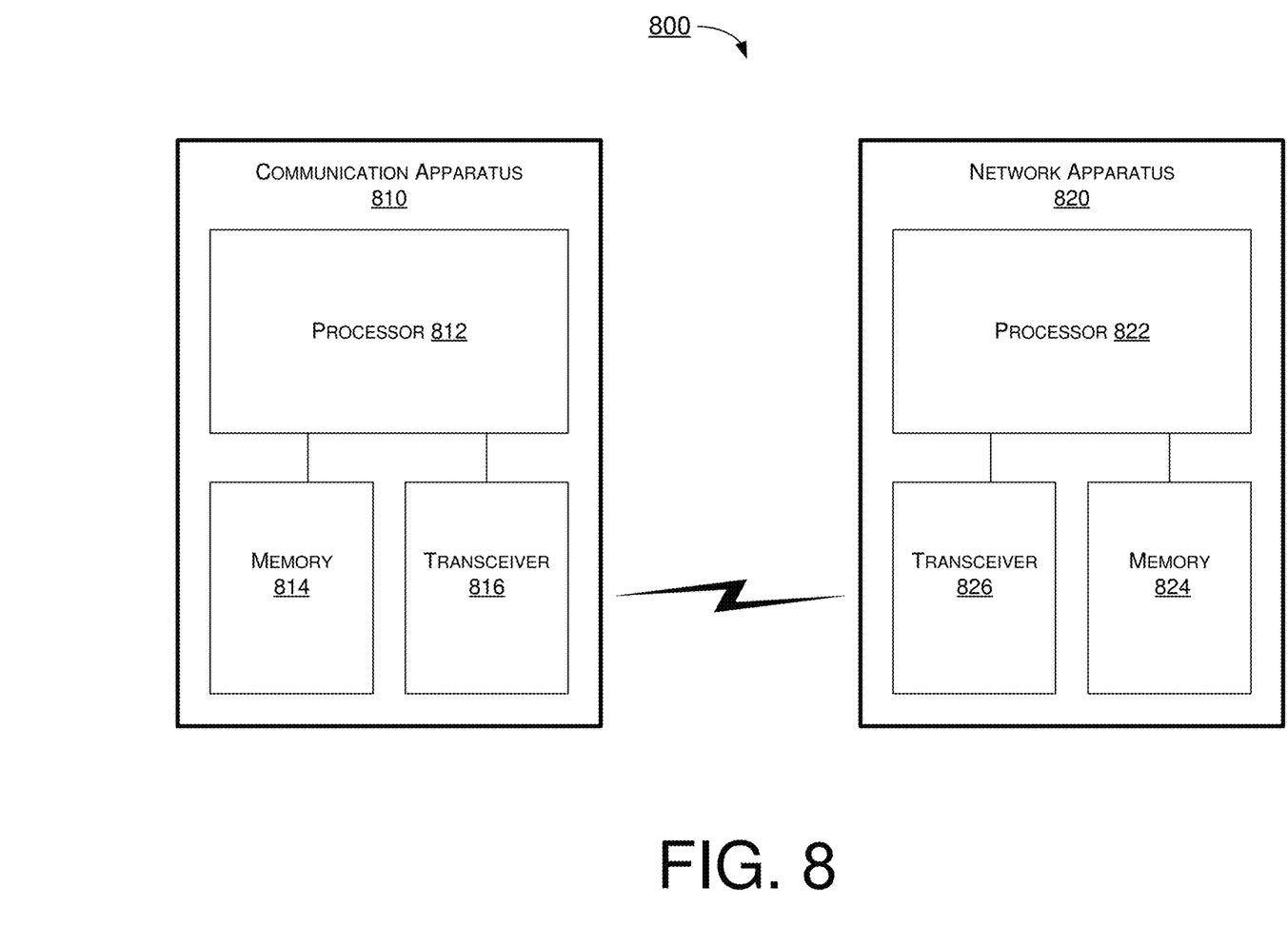
FIG. 8 is a block diagram of an example communication system in accordance with an implementation of the present disclosure.
Figure 9:
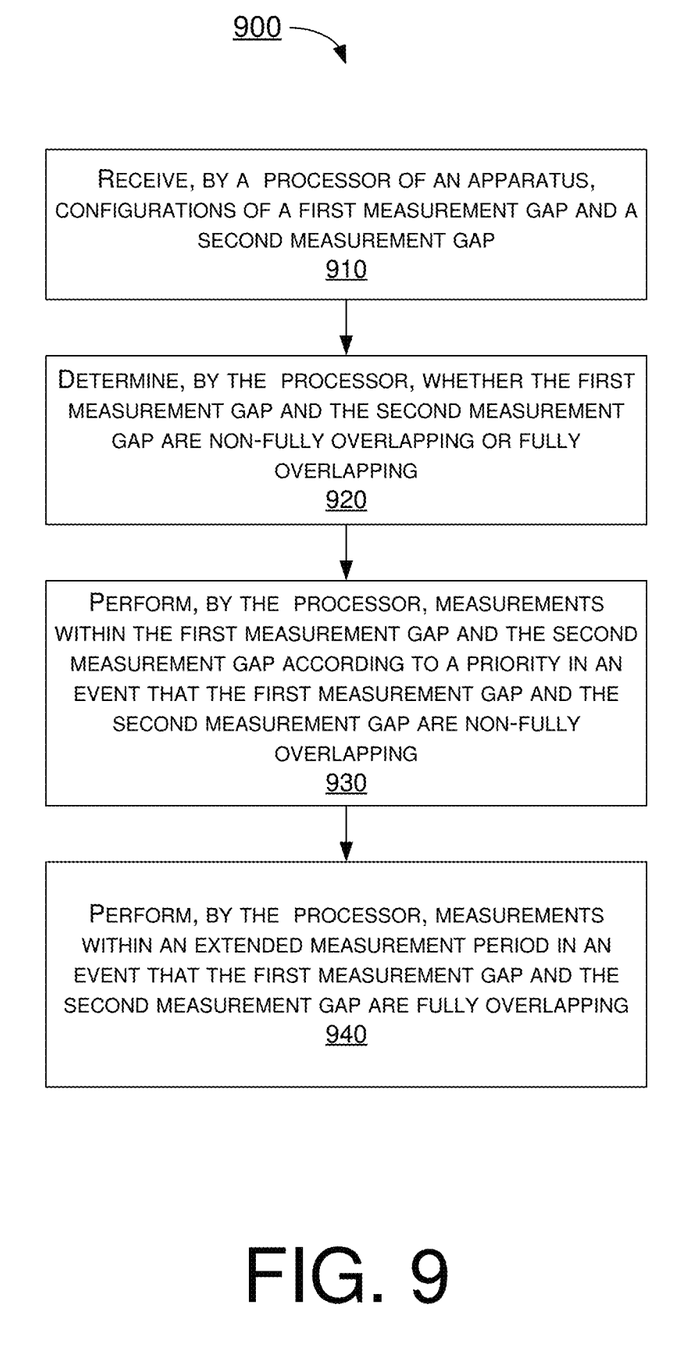
FIG. 9 is a flowchart of an example process in accordance with an implementation of the present disclosure.

FIG. 8 illustrates an example communication system 800 having an example communication apparatus 810 and an example network apparatus 820 in accordance with an implementation of the present disclosure. Each of communication apparatus 810 and network apparatus 820 may perform various functions to implement schemes, techniques, processes and methods described herein pertaining to SAN or NTN measurement within overlapping gaps with respect to user equipment and network apparatus in mobile communications, including scenarios/schemes described above as well as process 900 described below.

Communication apparatus 810 may be a part of an electronic apparatus, which may be a UE such as a portable or mobile apparatus, a wearable apparatus, a wireless communication apparatus or a computing apparatus. For instance, communication apparatus 810 may be implemented in a smartphone, a smartwatch, a personal digital assistant, a digital camera, or a computing equipment such as a tablet computer, a laptop computer or a notebook computer. Communication apparatus 810 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 810 may be implemented in a smart thermostat, a smart fridge, a smart door lock, a wireless speaker or a home control center. Alternatively, communication apparatus 810 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 910 may include at least some of those components shown in FIG. 8 such as a processor 812, for example. Communication apparatus 810 may further include one or more other components not pertinent to the proposed scheme of the present disclosure (e.g., internal power supply, display device and/or user interface device), and, thus, such component(s) of communication apparatus 810 are neither shown in FIG. 8 nor described below in the interest of simplicity and brevity.

Network apparatus 820 may be a part of a network apparatus, which may be a network node such as a satellite, a base station, a small cell, a router or a gateway. For instance, network apparatus 820 may be implemented in an eNodeB in an LTE network, in a gNB in a 5G/NR, IoT, NB-IoT or IIoT network or in a satellite or base station in a 6G network. Alternatively, network apparatus 820 may be implemented in the form of one or more IC chips such as, for example and without limitation, one or more single-core processors, one or more multi-core processors, or one or more RISC or CISC processors. Network apparatus 820 may include at least some of those components shown in FIG. 8 such as a processor 822, for example. Network apparatus 820 may further include one or more other components not pertinent to the proposed scheme of the present disclosure (e.g., internal power supply, display device and/or user interface device), and, thus, such component(s) of network apparatus 820 are neither shown in FIG. 8 nor described below in the interest of simplicity and brevity.

In one aspect, each of processor 812 and processor 822 may be implemented in the form of one or more single-core processors, one or more multi-core processors, or one or more CISC processors. That is, even though a singular term "a processor" is used herein to refer to processor 812 and processor 822, each of processor 812 and processor 822 may include multiple processors in some implementations and a single processor in other implementations in accordance with the present disclosure. In another aspect, each of processor 812 and processor 822 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 812 and processor 822 is a special-purpose machine specifically designed, arranged and configured to perform specific tasks including autonomous reliability enhancements in a device (e.g., as represented by communication apparatus 810) and a network (e.g., as represented by network apparatus 820) in accordance with various implementations of the present disclosure.

In some implementations, communication apparatus 810 may also include a transceiver 816 coupled to processor 812 and capable of wirelessly transmitting and receiving data. In some implementations, communication apparatus 810 may further include a memory 814 coupled to processor 812 and capable of being accessed by processor 812 and storing data therein. In some implementations, network apparatus 820 may also include a transceiver 826 coupled to processor 822 and capable of wirelessly transmitting and receiving data. In some implementations, network apparatus 820 may further include a memory 824 coupled to processor 822 and capable of being accessed by processor 822 and storing data therein. Accordingly, communication apparatus 810 and network apparatus 820 may wirelessly communicate with each other via transceiver 816 and transceiver 826, respectively. To aid better understanding, the following description of the operations, functionalities and capabilities of each of communication apparatus 810 and network apparatus 820 is provided in the context of a mobile communication environment in which communication apparatus 810 is implemented in or as a communication apparatus or a UE and network apparatus 820 is implemented in or as a network node of a communication network.

In some implementations, processor 812 may receive configurations of a first measurement gap and a second measurement gap. Processor 812 may determine whether the first measurement gap and the second measurement gap are non-fully overlapping or fully overlapping. Processor 812 may perform measurements within the first measurement gap and the second measurement gap according to a priority in an event that the first measurement gap and the second measurement gap are non-fully overlapping. Processor 812 may perform measurements within an extended measurement period in an event that the first measurement gap and the second measurement gap are fully overlapping.

In some implementations, processor 812 may determine that the first measurement gap and the second measurement gap are non-fully overlapping in an event that a measurement gap occasion of the first measurement gap is not overlapped with a measurement gap occasion of the second measurement gap.

In some implementations, the priority may comprise a first priority configured for the first measurement gap and a second priority configured for the second measurement gap.

In some implementations, processor 812 may perform the measurements within the second measurement gap first in an event that the measurement gap occasion of the first measurement gap and the measurement gap occasion of the second measurement gap are concurrent and the second priority is higher than the first priority.

In some implementations, processor 812 may determine that the first measurement gap and the second measurement gap are overlapping in an event that a measurement gap occasion of the first measurement gap is fully overlapped or partially overlapped with a measurement gap occasion of the second measurement gap, or a distance in time between the first measurement gap occasion and the second measurement gap occasion is less than a threshold.

In some implementations, processor 812 may determine the extended measurement period according to a number of fully overlapping measurement gaps.

In some implementations, processor 812 may perform the measurements within the first measurement gap and the second measurement gap by a TDM manner within the extended measurement period.

In some implementations, processor 812 may determine that the first measurement gap and the second measurement gap are fully overlapping in an event that each measurement gap occasion of the first measurement gap is overlapped with each measurement gap occasion of the second measurement gap.

In some implementations, processor 812 may allow a data interruption within the first measurement gap or the second measurement gap in an event that the first measurement gap and the second measurement gap are non-fully overlapping.

In some implementations, processor 812 may allow a data interruption within the first measurement gap and the second measurement gap in an event that the first measurement gap and the second measurement gap are fully overlapping.

Illustrative Processes

FIG. 9 illustrates an example process 900 in accordance with an implementation of the present disclosure. Process 900 may be an example implementation of above scenarios/schemes, whether partially or completely, with respect to SAN or NTN measurement within overlapping gaps with the present disclosure. Process 900 may represent an aspect of implementation of features of communication apparatus 810. Process 900 may include one or more operations, actions, or functions as illustrated by one or more of blocks 910, 920, 930 and 940. Although illustrated as discrete blocks, various blocks of process 900 may be divided into additional blocks, combined into fewer blocks, or eliminated, depending on the desired implementation. Moreover, the blocks of process 900 may be executed in the order shown in FIG. 9 or, alternatively, in a different order. Process 900 may be implemented by communication apparatus 810 or any suitable UE or machine type devices. Solely for illustrative purposes and without limitation, process 900 is described below in the context of communication apparatus 810. Process 900 may begin at block 910.

At 910, process 900 may involve processor 812 of communication apparatus 810 d receiving configurations of a first measurement gap and a second measurement gap. Process 900 may proceed from 910 to 920.

At 920, process 900 may involve processor 812 determining whether the first measurement gap and the second measurement gap are non-fully overlapping or fully overlapping. Process 900 may proceed from 920 to 930.

At 930, process 900 may involve processor 812 performing measurements within the first measurement gap and the second measurement gap according to a priority in an event that the first measurement gap and the second measurement gap are non-fully overlapping. The priority may comprise a first priority configured for the first measurement gap and a second priority configured for the second measurement gap. Process 900 may proceed from 930 to 940.

At 940, process 900 may involve processor 812 performing measurements within an extended measurement period in an event that the first measurement gap and the second measurement gap are fully overlapping.

In some implementations, process 900 may further involve processor 812 determining that the first measurement gap and the second measurement gap are non-fully overlapping in an event that a measurement gap occasion of the first measurement gap is not overlapped with a measurement gap occasion of the second measurement gap.

In some implementations, process 900 may further involve processor 812 performing the measurements within the second measurement gap first in an event that the measurement gap occasion of the first measurement gap and the measurement gap occasion of the second measurement gap are concurrent and the second priority is higher than the first priority.

In some implementations, process 900 may further involve processor 812 determining that the first measurement gap and the second measurement gap are overlapping in an event that a measurement gap occasion of the first measurement gap is fully overlapped or partially overlapped with a measurement gap occasion of the second measurement gap, or a distance in time between the measurement gap occasion of the first measurement gap and the measurement gap occasion of the second measurement gap is less than a threshold.

In some implementations, process 900 may further involve processor 812 determining the extended measurement period according to a number of fully overlapping measurement gaps.

In some implementations, process 900 may further involve processor 812 performing the measurements within the first measurement gap and the second measurement gap by a time division multiplexing (TDM) manner within the extended measurement period.

In some implementations, process 900 may further involve processor 812 determining that the first measurement gap and the second measurement gap are fully overlapping in an event that each measurement gap occasion of the first measurement gap is overlapped with each measurement gap occasion of the second measurement gap.

In some implementations, process 900 may further involve processor 812 allowing a data interruption within the first measurement gap or the second measurement gap in an event that the first measurement gap and the second measurement gap are non-fully overlapping.

In some implementations, process 900 may further involve processor 812 allowing a data interruption within the first measurement gap and the second measurement gap in an event that the first measurement gap and the second measurement gap are fully overlapping.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of an apparatus, configurations of a first measurement gap and a second measurement gap;
   determining, by the processor, whether the first measurement gap and the second measurement gap are non-fully overlapping or fully overlapping; and
   performing, by the processor, measurements within an extended measurement period in an event that the first measurement gap and the second measurement gap are fully overlapping,
   wherein the determining comprises determining that the first measurement gap and the second measurement gap are fully overlapping in an event that:
       each measurement gap occasion of the first measurement gap is partially overlapped, but not fully overlapped, with a respective measurement gap occasion of the second measurement gap; or
       a time interval between each measurement gap occasion of the second measurement gap and a respective measurement gap occasion of the first measurement gap is less than a threshold.

2. The method of claim 1, further comprising:
   determining, by the processor, that the first measurement gap and the second measurement gap are non-fully overlapping in an event that a measurement gap occasion of the first measurement gap is not overlapped with a measurement gap occasion of the second measurement gap.

3. The method of claim 2, wherein the priority comprises a first priority configured for the first measurement gap and a second priority configured for the second measurement gap.

4. The method of claim 3, wherein the performing comprises performing the measurements within the second measurement gap first in an event that the measurement gap occasion of the first measurement gap and the measurement gap occasion of the second measurement gap are concurrent and the second priority is higher than the first priority.

5. The method of claim 1, further comprising:
   determining, by the processor, the extended measurement period according to a number of fully overlapping measurement gaps.

6. The method of claim 1, wherein the performing comprises performing the measurements within the first measurement gap and the second measurement gap by a time division multiplexing (TDM) manner within the extended measurement period.

7. The method of claim 1, further comprising:
   determining, by the processor, that the first measurement gap and the second measurement gap are fully overlapping in an event that each measurement gap occasion of the first measurement gap is overlapped with each measurement gap occasion of the second measurement gap.

8. The method of claim 1, further comprising:
allowing, by the processor, a data interruption within the first measurement gap or the second measurement gap in an event that the first measurement gap and the second measurement gap are non-fully overlapping.

9. The method of claim 1, further comprising:
allowing, by the processor, a data interruption within the first measurement gap and the second measurement gap in an event that the first measurement gap and the second measurement gap are fully overlapping.

10. An apparatus, comprising:
a transceiver which, during operation, wirelessly communicates with at least one network node of a wireless network; and
a processor communicatively coupled to the transceiver such that, during operation, the processor performs operations comprising:
receiving, via the transceiver, configurations of a first measurement gap and a second measurement gap;
determining whether the first measurement gap and the second measurement gap are non-fully overlapping or fully overlapping; and
performing measurements within an extended measurement period in an event that the first measurement gap and the second measurement gap are fully overlapping,
wherein the determining comprises determining that the first measurement gap and the second measurement gap are fully overlapping in an event that:
each measurement gap occasion of the first measurement gap is partially overlapped, but not fully overlapped, with a respective measurement gap occasion of the second measurement gap; or
a time interval between each measurement gap occasion of the second measurement gap and a respective measurement gap occasion of the first measurement gap is less than a threshold.

11. The apparatus of claim 10, wherein, during operation, the processor further performs operations comprising:
determining that the first measurement gap and the second measurement gap are non-fully overlapping in an event that a measurement gap occasion of the first measurement gap is not overlapped with a measurement gap occasion of the second measurement gap.

12. The apparatus of claim 11, wherein the priority comprises a first priority configured for the first measurement gap and a second priority configured for the second measurement gap.

13. The apparatus of claim 12, wherein, in performing the measurements, the processor performs the measurements within the second measurement gap first in an event that the measurement gap occasion of the first measurement gap and the measurement gap occasion of the second measurement gap are concurrent and the second priority is higher than the first priority.

14. The apparatus of claim 10, wherein, during operation, the processor further performs operations comprising:
determining the extended measurement period according to a number of fully overlapping measurement gaps.

15. The apparatus of claim 10, wherein, in performing the measurements, the processor performs the measurements within the first measurement gap and the second measurement gap by a time division multiplexing (TDM) manner within the extended measurement period.

16. The apparatus of claim 10, wherein, during operation, the processor further performs operations comprising:
determining that the first measurement gap and the second measurement gap are fully overlapping in an event that each measurement gap occasion of the first measurement gap is overlapped with each measurement gap occasion of the second measurement gap.

17. The apparatus of claim 10, wherein, during operation, the processor further performs operations comprising:
allowing a data interruption within the first measurement gap or the second measurement gap in an event that the first measurement gap and the second measurement gap are non-fully overlapping.

18. The apparatus of claim 10, wherein, during operation, the processor further performs operations comprising:
allowing a data interruption within the first measurement gap and the second measurement gap in an event that the first measurement gap and the second measurement gap are fully overlapping.

* * * * *